United States Patent
Huntwork et al.

(10) Patent No.: US 9,866,571 B2
(45) Date of Patent: *Jan. 9, 2018

(54) SECURING EXECUTION OF CUSTOMER-SUPPLIED NETWORK PAGE GENERATION CODE

(71) Applicant: Amazon Technologies, Inc., Seattle, WA (US)

(72) Inventors: Andrew S. Huntwork, Seattle, WA (US); Prashant J. Thakare, Mercer Island, WA (US); Shashank Shekhar, Hyderabad (IN); Pravi Garg, Seattle, WA (US); Jeremy Boynes, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

This patent is subject to a terminal disclaimer.

(21) Appl. No.: 14/523,325

(22) Filed: Oct. 24, 2014

(65) Prior Publication Data

US 2015/0047031 A1 Feb. 12, 2015

Related U.S. Application Data

(63) Continuation of application No. 13/348,069, filed on Jan. 11, 2012, now Pat. No. 8,874,688.

(51) Int. Cl.
*H04L 29/06* (2006.01)
*G06F 11/36* (2006.01)
(Continued)

(52) U.S. Cl.
CPC ............ *H04L 63/1408* (2013.01); *G06F 8/30* (2013.01); *G06F 11/076* (2013.01);
(Continued)

(58) Field of Classification Search
CPC .... H04L 63/1408; G06F 8/30; G06F 11/0721; G06F 11/076; G06F 11/3003; G06F 11/3466; G06F 11/3608
(Continued)

(56) References Cited

U.S. PATENT DOCUMENTS 7,620,653 B1 11/2009 Swartz
7,720,939 B1 5/2010 Leroy
(Continued)

OTHER PUBLICATIONS

U.S. Appl. No. 13/363,761 entitled "Multipart Encoding in Data Aggregation for Network Page Generation," filed Feb. 1, 2012.
(Continued)

*Primary Examiner* — Tu Nguyen
(74) *Attorney, Agent, or Firm* — Thomas Horstemeyer, LLP

(57) ABSTRACT

Disclosed are various embodiments for securing execution of page generation code. The page generation code may be instrumented with code that facilitates monitoring of one or more resources consumed by the page generation code. Various checks relating, for example, to code size and whether exception-handling code is present may be performed. The page generation code may be executed to generate a network page in response to a request obtained from a client. One or more resource consumption limits may be enforced upon the page generation code.

20 Claims, 5 Drawing Sheets

(51) Int. Cl.
  *G06F 11/07* (2006.01)
  *G06F 9/44* (2006.01)
  *G06F 11/30* (2006.01)
  *G06F 9/455* (2006.01)
  *G06F 11/34* (2006.01)

(52) U.S. Cl.
  CPC ...... *G06F 11/0721* (2013.01); *G06F 11/3003* (2013.01); *G06F 11/3466* (2013.01); *G06F 11/3608* (2013.01); *G06F 9/45504* (2013.01); *G06F 11/3409* (2013.01); *G06F 2201/81* (2013.01); *G06F 2201/865* (2013.01)

(58) Field of Classification Search
  USPC .......................................................... 709/217
  See application file for complete search history.

(56) References Cited

U.S. PATENT DOCUMENTS

| | | | |
|---|---|---|---|
| 8,332,825 B2 | 12/2012 | Mital et al. | |
| 8,706,803 B1* | 4/2014 | Whitcomb | H04L 67/42 709/203 |
| 2002/0046240 A1 | 4/2002 | Graham et al. | |
| 2002/0165936 A1 | 11/2002 | Alston et al. | |
| 2007/0266373 A1 | 11/2007 | Liu | |
| 2011/0088039 A1* | 4/2011 | Tabone | G06F 17/30097 718/104 |

OTHER PUBLICATIONS

U.S. Appl. No. 13/363,770 entitled "Loading Customer-Supplied Network Page Generation Code," filed Feb. 1, 2012.
U.S. Appl. No. 13/363,782 entitled "Error Handling in a Network Page Generation Environment," filed Feb. 1, 2012.
U.S. Appl. No. 13/363,787 entitled "Data Contracts for Network Page Generation Code," filed Feb. 1, 2012.
U.S. Appl. No. 13/363,816 entitled "Network Site Hosting in a Managed Environment," filed Feb. 1, 2012.
U.S. Appl. No. 13/348,051 entitled "Generating Network Page Using Customer-Supplied Generation Code," filed Jan. 11, 2012.
U.S. Appl. No. 13/348,088 entitled "Facilitating Access to Data in Network Page Generation Code," filed Jan. 11, 2012.
U.S. Appl. No. 13/348,081 entitled "Virtual File System for Hosted Network Sites," filed Jan. 11, 2012.
U.S. Appl. No. 13/348,059 entitled "Generating Network Page Using Customer-Generated Network Page Portions," filed Jan. 11, 2012.
U.S. Appl. No. 13/347,953 entitled "Opportunistic Unloading of Network Applications," filed Jan. 11, 2012.

* cited by examiner ance with the security standards. However, merchants may lose flexibility in customizing or configuring their network sites when using such a hosted solution as compared with a self-managed solution.

SECURING EXECUTION OF CUSTOMER-SUPPLIED NETWORK PAGE GENERATION CODE

CROSS-REFERENCE TO RELATED APPLICATION

This application is a continuation of, and claims priority to, co-pending U.S. patent application entitled "SECURING EXECUTION OF CUSTOMER-SUPPLIED NETWORK PAGE GENERATION CODE," filed on Jan. 11, 2012, and assigned application Ser. No. 13/348,069, which is incorporated herein by reference in its entirety.

BACKGROUND

Compliance with Payment Card Industry Data Security Standards (PCI DSS) and/or other security standards may present challenges for online merchants. For this and other reasons, online merchants may elect to have their electronic commerce platform managed by a third-party electronic commerce hosting provider who ensures compli-

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to securing execution of customer-supplied network page generation code on a hosted network page server platform. Merchants and other owners of network page sites may contract with hosting providers to generate and serve up their network sites in a managed environment. For example, a hosting provider may offer an end-to-end hosted electronic commerce platform that maintains an item catalog, generates detail pages for items, facilitates searching for items, facilitates browsing for items by way of a taxonomy or by way of suggested items, allows for customer reviews of items, and so on. Such a hosted electronic commerce platform may include functionality relating to shopping carts, order placement, order management and fulfillment, and/or other functionality. Such a platform offers merchants many advantages over self-managed solutions.

Merchants may wish to retain stylistic and content control over their online presence, even if it leverages an end-to-end hosted electronic platform. However, the hosting provider may be reluctant to grant the merchant access to execute arbitrary page generation code due to security concerns and compliance requirements for Payment Card Industry Data Security Standards (PCI DSS) and/or other security standards. Various embodiments of the present disclosure facilitate customer control over network page generation with a hosted network site. As used herein, the term "customer" may also include developers acting on behalf of customers of the hosting provider.

In various embodiments, a merchant or other customer of the hosting provider is able to upload page generation code for execution server-side. Data aggregation may be performed on behalf of the page generation code so that the page generation code does not contact data sources directly. Various compile-time restrictions may be placed on the page generation code. Also, various run-time restrictions on resource consumption by the page generation code may be implemented by instrumenting the page generation code and/or the environment that executes the page generation code. Consequently, computing resources of the hosting provider are protected against accidental or intentional misuse. Although the present application refers to network pages and page generation, it is understood that the principles herein may be extended to data that is generated in a managed environment. In the following discussion, a general description of the system and its components is provided, followed by a discussion of the operation of the same.

Figure 1:
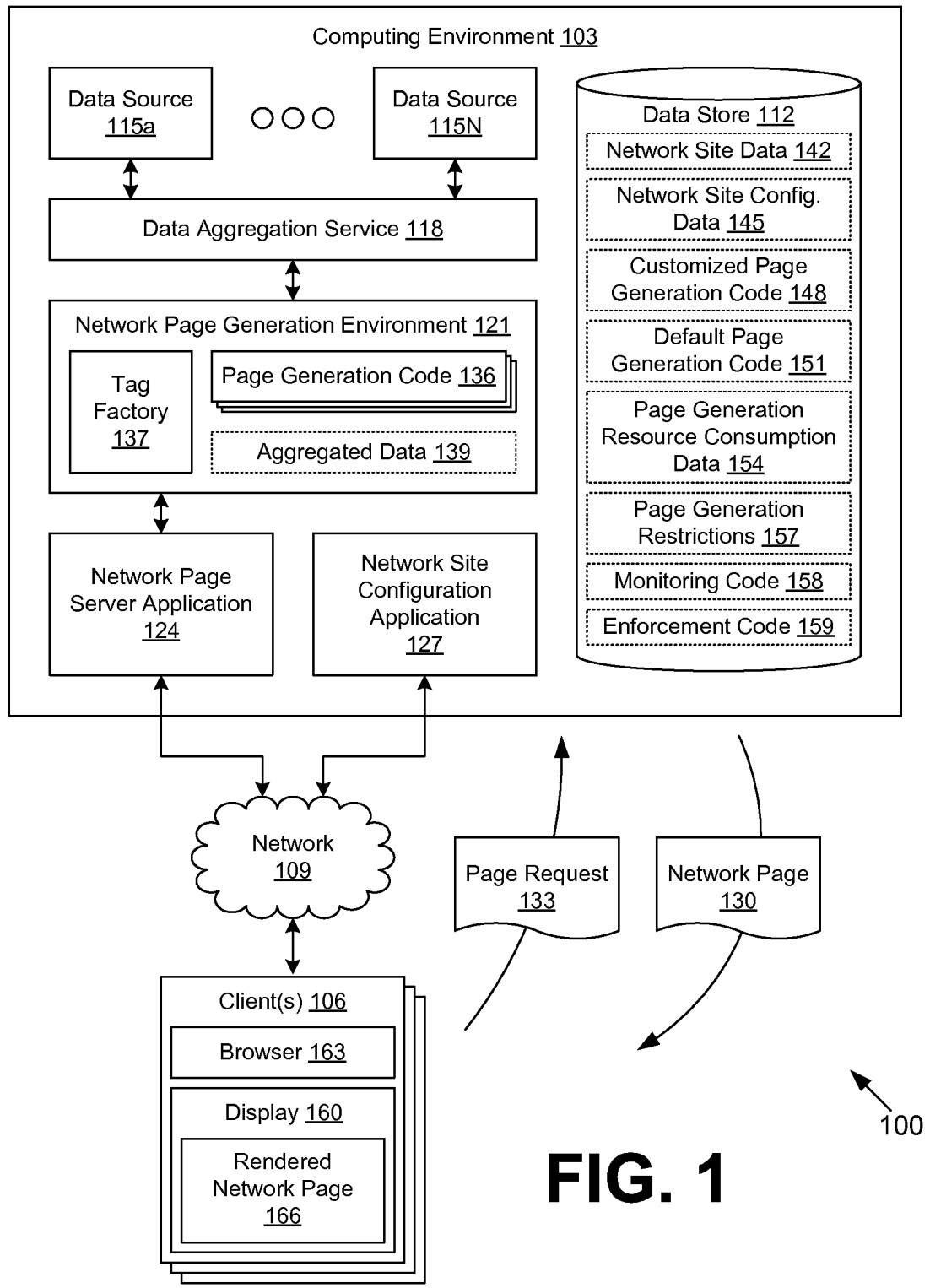
FIG. 1 is a drawing of a networked environment according to various embodiments of the present disclosure.

With reference to FIG. 1, shown is a networked environment 100 according to various embodiments relating to customer-supplied page generation code. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103 may be operated by a hosting provider to host network sites for various customers.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed by the computing environment 103, for example, include a plurality of data sources 115a . . . 115N, a data aggregation service 118, a network page generation environment 121, a network page server application 124, a network site configuration application 127, and other applications, services, processes, systems, engines, or functionality not discussed in detail herein. The data sources 115 are executed to provide various data used in generating network pages 130 for network sites of customers of the hosting provider. Where the customers are merchants, the data provided by the data sources 115 may relate to electronic commerce data such as, for example, item catalog data, item suggestions data, shopping cart data, checkout data, order data, and so on. In one embodiment, the data sources 115 may comprise web services. In another embodiment, the data sources 115 may comprise files or other forms of data stores.

The data aggregation service 118 is executed to aggregate data from the data sources 115 for use in generation of network pages 130. The data aggregation service 118 may employ parallel fetching to reduce latency when data is aggregated from multiple data sources 115.

The network page generation environment 121 is executed to generate the network pages 130 in response to page requests 133 obtained from clients 106. The network pages 130 may correspond to web pages, gopher pages, mobile application screens, and/or other forms of network content. Where the customer is a merchant, the network pages 130 may correspond to home pages, catalog pages, item detail pages, shopping cart pages, checkout pages, order confirmation pages, and so on. Such network pages 130 may facilitate selecting items for purchase, rental, download, lease, or other form of consumption. In addition, where the customer is a merchant, the network page generation environment 121 may include, or be in communication with, an electronic commerce system that performs various backend functions in order to facilitate the online purchase of items.

The network page generation environment 121 may execute page generation code 136 in order to generate the network pages 130. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into Java® servlets, which in turn may be compiled into bytecode which may be executable by the network page generation environment 121.

To this end, the network page generation environment 121 may include a Java Virtual Machine (JVM) and a servlet container such as Apache® Tomcat® or another servlet container. In one embodiment, the page generation code 136 may be instrumented in order to facilitate monitoring of one or more resources consumed by the page generation code 136. Such resources may correspond to execution time, processor time, memory allocation, data written to an output stream, and so on. In various embodiments, the network page generation environment 121 may include one or more tag factories 137. Such a tag factory 137 may correspond to a JSP tag factory, a JSP tag library, or other similar components. For example, the page generation code 136 may be configured to call the tag factory 137 in order to invoke particular functionality. In one embodiment, the tag factory 137 may be instrumented in order to enforce one or more resource consumption limits on the execution of the page generation code 136.

The network page generation environment 121 may be configured to obtain aggregated data 139 from the data aggregation service 118 and to provide the aggregated data 139 to the page generation code 136, for example, as a set of predefined implicit variables or by another approach. The network page generation environment 121 may act as a "sandbox" for the page generation code 136 to enforce restrictions on application programming interface (API) calls, access to the data source 115, and/or other resources in the computing environment 103. As a non-limiting example, where the network page generation environment 121 includes a JVM, a security manager may be installed in the JVM to deny access by the page generation code 136 to system data, data of other customers, and so on.

The network page server application 124 is configured to obtain the page requests 133 from the client 106 over the network 109, to generate network pages 130 in response to the page requests 133 using the network page generation environment 121, and to return the network pages 130 to the client 106 by way of the network 109. The network page server application 124 may correspond to a commercially available hypertext transfer protocol (HTTP) server such as, for example, Apache® HTTP Server, Apache® Tomcat®, Microsoft® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may implement an HTTP server, a web-based distributed authoring and versioning (WebDAV) server, a file transfer protocol (FTP) server, and/or other servers. The network site configuration application 127 may include various components and/or may invoke various components of the network page generation environment 121 to enforce compile-time restrictions on the page generation code 136.

The data stored in the data store 112 includes, for example, network site data 142, network site configuration data 145, customized page generation code 148, default page generation code 151, a page generation resource consumption data 154, page generation restrictions 157, monitoring code 158, enforcement code 159, and potentially other data. The network site data 142 corresponds to data used in the generation of the network pages 130 for the hosted network sites of the merchants or other customers. Such data may include, for example, templates, hypertext markup language (HTML), text, extensible markup language (XML), cascading style sheets (CSS), images, audio, video, animations, and/or other data.

The network site configuration data 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 which is created or customized by merchants or other customers. The default page generation code 151 may correspond to a default set of page generation code 136 for a merchant or other customer to use for a base functionality for a network site. The default page generation code 151 may generate network pages 130 having, for example, a default appearance and behavior for a generic electronic commerce site.

The page generation resource consumption data 154 may indicate the computing resources consumed by the page generation code 136 and/or the network page generation environment 121 in generating network pages 130 for customer network sites. The page generation resource consumption data 154 may include statistics such as average execution time, memory consumption, data written, and so on for many different instances of page generation code 136 for many different customers of the hosting provider. The page generation restrictions 157 may configure various restrictions to be placed on the page generation code 136 by the network page generation environment 121. As a non-limiting example, where the page generation code 136 corresponds to JSP code, the network page generation environment 121 may restrict the JSP code from including scriptlets and/or various API calls. Various functionalities may be whitelisted or blacklisted, as the case may be. Such restrictions may be configured by way of parameters in the page generation restrictions 157.

The monitoring code 158 may correspond to various code segments that are configured to facilitate monitoring of the resource consumption of the page generation code 136 when executed by the network page generation environment 121. The enforcement code 159 may correspond to various code segments that are configured to facilitate enforcement of resource consumption limits and/or other restrictions for the page generation code 136 when executed by the network page generation environment 121. The network page generation code 136, the tag factory 137, and/or the network page generation environment 121 may be instrumented with the monitoring code 158 and/or the enforcement code 159.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 130 served up by the computing environment 103 and/or other servers, thereby generating a rendered network page 166 on the display 160. The client 106 may be configured to execute applications beyond the browser 163 such as, for example, code development applications, file transfer applications, mobile applications, email applications, instant message applications, and/or other applications.

Next, a general description of the operation of the various components of the networked environment 100 is provided. To begin, a merchant or other customer of a hosting provider associated with the computing environment 103 configures a network site to be hosted through the computing environment 103. The network site may have a common domain that is shared by multiple customers of the hosting provider, or the network site may correspond to a unique domain for each customer. The merchant or other customer may adopt default page generation code 151 for various network pages 130 accessible through the network site. Alternatively, or additionally, the merchant or other customer may create customized page generation code 148 for generating some or all of the network pages 130 accessible through the network site.

The merchant or other customer may interact with the network site configuration application 127 to customize or make changes to the network site. In various cases, the customer may edit the page generation code 136 directly through the network site configuration application 127, or the customer may upload replacement page generation code 136. Through this system, customers are able to control generation of network pages 130 for their network sites, despite using a hosted infrastructure and potentially a hosted electronic commerce platform.

When a customer uploads or edits page generation code 136, the network site configuration application 127 and/or the network page generation environment 121 may perform various verifications on the static code. Such verifications may be referred to as compile-time checks, but need not occur at the same time the page generation code 136 is compiled, and in some cases, the page generation code 136 may be interpreted rather than compiled. Such verifications may be performed as configured by the page generation restrictions 157.

Some non-examples of the static code verifications will now be discussed. The data size of the page generation code 136 may be compared with a maximum size threshold to determine whether the page generation code 136 meets the maximum size threshold. That is to say, it is determined whether the page generation code 136 is unacceptably large, which may be a security risk.

Also, the page generation code 136 may be examined to determine whether it contains any exception-handling code. In one embodiment, runtime enforcement of security restrictions may be made by throwing exceptions, and exception handling code, such as "try" and "catch" blocks, may therefore interfere with such enforcement. Further, the page generation code 136 may be examined to determine whether it includes scriptlets, restricted API calls, restricted data accesses, and so on. If the page generation code 136 fails these compile-time checks, the page generation code 136 may be rejected (i.e., not accepted) and not used in production for generation of network pages 130. If the page generation code 136 is not rejected, it may then be ready to be compiled, if applicable.

The page generation code 136 is able to access the aggregated data 139 generated by the data aggregation service 118. In some cases, the page generation code 136 may declare various data that it accesses, which is then aggregated by the data aggregation service 118. In other cases, the data aggregation service 118 may provide a standard set of data from the data sources 115. The set of data may depend on the type of network page 130, e.g., whether the network page 130 is a checkout page, catalog page, order confirmation page, and so on. In one example, the aggregated data 139 may be associated with the hosted electronic commerce platform provided by the hosting provider. The aggregated data 139 may be provided to the page generation code 136 by way of implicit variables or other variables that are available in the scope of the page generation code 136. The page generation code 136 may be configured to use all of the predefined variables or a subset of the predefined variables. The page generation code 136 may be restricted from accessing the data sources 115 directly. For example, a JVM in the network page generation environment 121 may be configured to deny access by the page generation code 136 to system variables other than certain implicit variables.

In operation, the client 106 sends a page request 133 to the network page server application 124 for some network page 130 from a network site of a customer. The network site is hosted on behalf of the customer by the hosting provider who operates the computing environment 103. Where the customer is a merchant, the hosting provider may operate a hosted electronic commerce platform in conjunction with the computing environment 103. The page request 133 is provided to the network page generation environment 121, which then obtains the aggregated data 139 from the data aggregation service 118. The aggregation may be performed automatically in response to the page request 133 or in advance of the page request 133. The data aggregation service 118 fetches the aggregated data 139 from one or more data sources 115.

The page generation code 136 for the requested network page 130 is executed by the network page generation environment 121. The network page generation environment 121 facilitates access to the aggregated data 139 by the page generation code 136. The page generation code 136 generates the network page 130, and the network page server application 124 serves up the network page 130 to the client 106 in response to the page request 133.

In some embodiments, the page generation code 136 is restricted from accessing one or more of the data sources 115. The customer-supplied page generation code 136 may be isolated from one or more of the data sources 115 for purposes of complying with PCI DSS and/or other security standards. Consequently, the data from the data sources 115 may be accessible only as aggregated data 139 provided by the data aggregation service 118. It is noted that the data aggregation service 118 may generate the aggregated data 139 in response to the page request 133, in response to other events, or at other times as desired.

The page generation code 136 may be analyzed for compliance with one or more policies according to the page generation restrictions 157 at runtime. Although compile-time checks may be performed, compile-time checks may be insufficient to evaluate the compliance of the page generation code 136 fully. Where the page generation code 136 corresponds to a Turing-complete programming language, it may be impossible or impractical to assess when the page generation code 136 will finish, which may necessitate various runtime compliance verifications. Runtime verifications may include acceptable content of the network page 130, API usage, usage of scriptlets or other disallowed language features, and so on. If the page generation code 136 is determined to be non-compliant, the page generation code 136 may be unexecuted, terminated if already executing, replaced with default page generation code 151, or another action may be taken.

In particular, the page generation code 136 as it is executed may be evaluated for compliance with one or more resource consumption limits. Such limits may pertain to memory allocation, processor usage, execution time, data written to an output data stream (i.e., the network page 130 or a portion thereof), and/or other resources. If page generation code 136 runs excessively long, uses excessive memory, writes excessive data, and/or otherwise excessively consumes resources, the performance of other page generation code 136 in the computing environment 103 may be impacted. Such excessive resource consumption may result from coding defects, compromised code, and/or other intentional or inadvertent causes. Where data is provided by the data aggregation service 118, it may be relatively simple to place broad restrictions on the page generation code 136 to assure compliance with security policies and resource consumption limits. Also, where the data is provided by the data aggregation service 118, processor usage and execution time of the page generation code 136 may be considered roughly equivalent due to lack of blocking for input/output operations.

It may be difficult to assess resource consumption of particular page generation code 136 through native facilities of a JVM or an operating system. Thus, the page generation code 136, the tag factory 137, the JVM, and/or other components in the network page generation environment 121 may be instrumented to monitor resource consumption of the page generation code 136. For example, monitoring code 158 and/or enforcement code 159 may be added to the source code of the page generation code 136 before it is compiled or interpreted, to the page generation code 136 as it is being interpreted or executed, to compiled bytecode of the page generation code 136 with bytecode weaving, to classes of the JVM, to classes of the tag factory 137, and so on.

In one embodiment, whenever the page generation code 136 invokes particular functionality that is known or assumed to have a particular resource consumption, the particular resource consumption may be recorded or reported. The resource consumption may be then compared with various resource consumption limits. The resource consumption may be actual or estimated. As a non-limiting example, a particular functionality may be associated with three memory units. When the functionality is invoked by the page generation code 136, three memory units may be added to the total for the page generation code 136. The total may then be compared with some limit for memory allocation to assess compliance with the limit. Such resource consumption may be in actual units (e.g., bytes, seconds, etc.) or in a relative measurement unit such as normalized or approximate units to facilitate relative consumption comparison.

In some situations, a resource consumption limit may be dynamically determined. As an example, a resource consumption limit may be dynamically determined relative to the available resources in the computing environment 103. As another example, a resource consumption limit may be dynamically determined with respect to some statistical measure of resource consumption determined from monitoring execution of multiple instances of page generation code 136 of multiple customers. Such information may be stored and available from the page generation resource consumption data 154. Accordingly, in one case, current resource consumption may be compared to average resource consumption to determine whether the current resource consumption is significantly above average (e.g., meeting some relative threshold).

In one embodiment, the page generation code 136 may be executed in an elastic computing resource, which can expand and contract with respect to computing capacity in response to demand for the capacity by the page generation code 136. Such usage may be monitored or metered for billing and/or other purposes. To this end, the elastic computing resource usage may be recorded in the page generation resource consumption data 154. This recognizes that page generation code 136 for some customers may be more computing resource intensive than page generation code 136 for other customers. Accordingly, an elastic amount of resources may be provided such that the customer is billed for what is used in terms of machine instances, memory, processor time, disk space, and/or other resources that are allocated for the customer.

Figure 2:
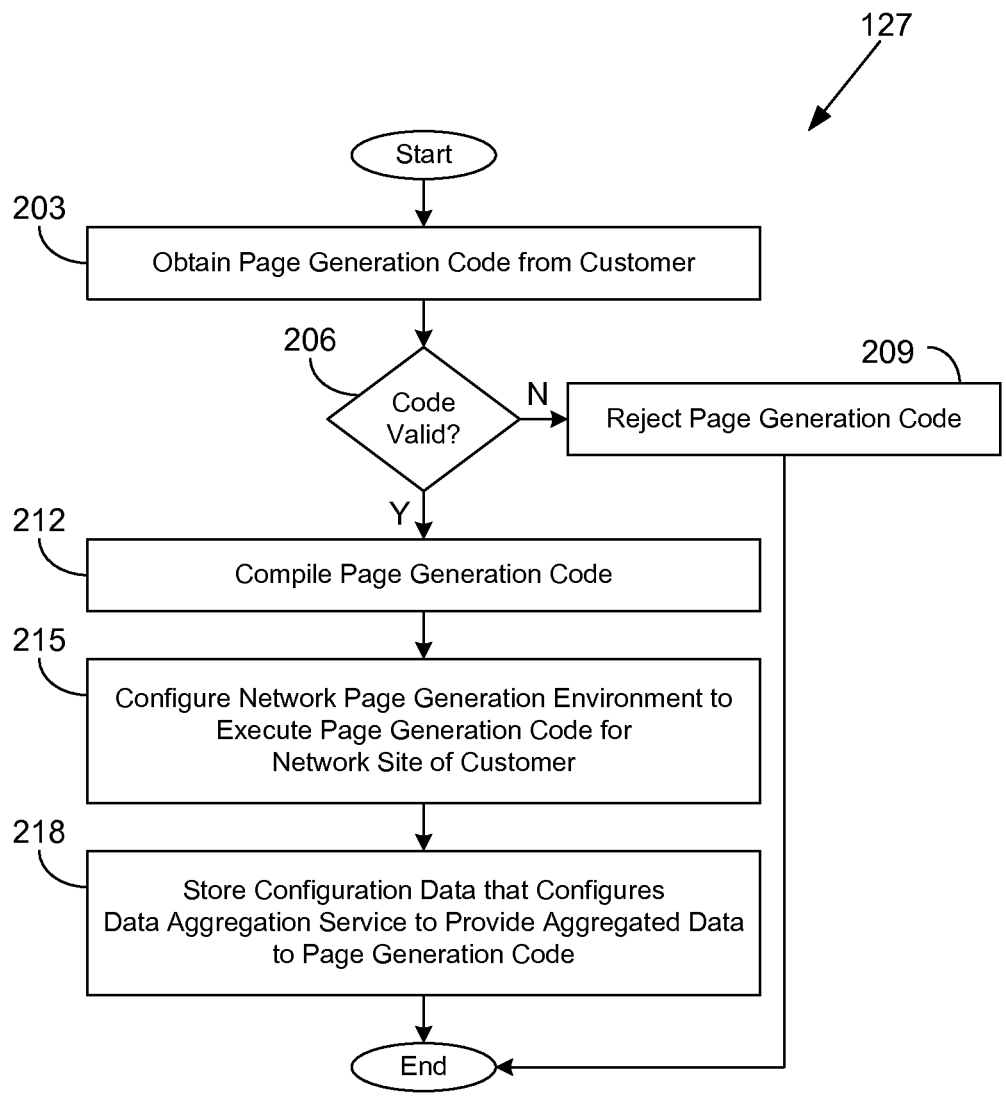
FIG. 2 is a flowchart illustrating one example of functionality implemented as portions of a network site configuration application executed in a computing environment in the networked environment of FIG. 1 according to various embodiments of the present disclosure.

Referring next to FIG. 2, shown is a flowchart that provides one example of the operation of a portion of the network site configuration application 127 according to the embodiments discussed in connection with FIG. 1. It is understood that the flowchart of FIG. 2 provides merely an example of the many different types of functional arrangements that may be employed to implement the operation of the portion of the network site configuration application 127 as described herein. As an alternative, the flowchart of FIG. 2 may be viewed as depicting an example of steps of a method implemented in the computing environment 103 (FIG. 1) according to one or more embodiments.

Beginning with box 203, the network site configuration application 127 obtains page generation code 136 (FIG. 1) from a customer whose network site is hosted by the hosting provider who operates the computing environment 103. The network site configuration application 127 may be configured to authenticate a client 106 (FIG. 1) associated with the customer. In box 206, the network site configuration application 127 determines whether the page generation code 136 is valid. In various examples, validity may depend on compliance with security policies and other restrictions that may be evaluated at or before compile time. If the page generation code 136 is not valid, the network site configuration application 127 rejects the page generation code 136 in box 209. An error may be presented to the customer. Thereafter, the portion of the network site configuration application 127 ends.

If the page generation code 136 is valid, the network site configuration application 127 proceeds from box 206 to box 212. Even assuming that the page generation code 136 is determined to be valid by the network site configuration application 127, validity checks may still need to be performed by the network page generation environment 121 (FIG. 1) at runtime. In box 212, the network site configuration application 127 compiles the page generation code 136. For example, the network site configuration application 127 may compile the page generation code 136 from a JSP into a servlet. The resulting servlet code may also be compiled into bytecode for execution by a Java® Virtual Machine (JVM) or directly by a processor circuit of the computing environment 103. In some embodiments, the page generation code 136 may be interpreted rather than compiled. Also, in some embodiments, the page generation code 136 may be instrumented with monitoring code 158 (FIG. 1) and/or enforcement code 159 (FIG. 1) to facilitate runtime compliance evaluation and enforcement.

In box 215, the network site configuration application 127 configures the network page generation environment 121 to execute the compiled page generation code 136 for one or more network pages 130 (FIG. 1) for the network site of the customer. In box 218, the network site configuration application 127 may store configuration data that configures the data aggregation service 118 (FIG. 1) to provide a set of aggregated data 139 (FIG. 1) to the page generation code 136. Thereafter, the portion of the network site configuration application 127 ends.

Figure 3:
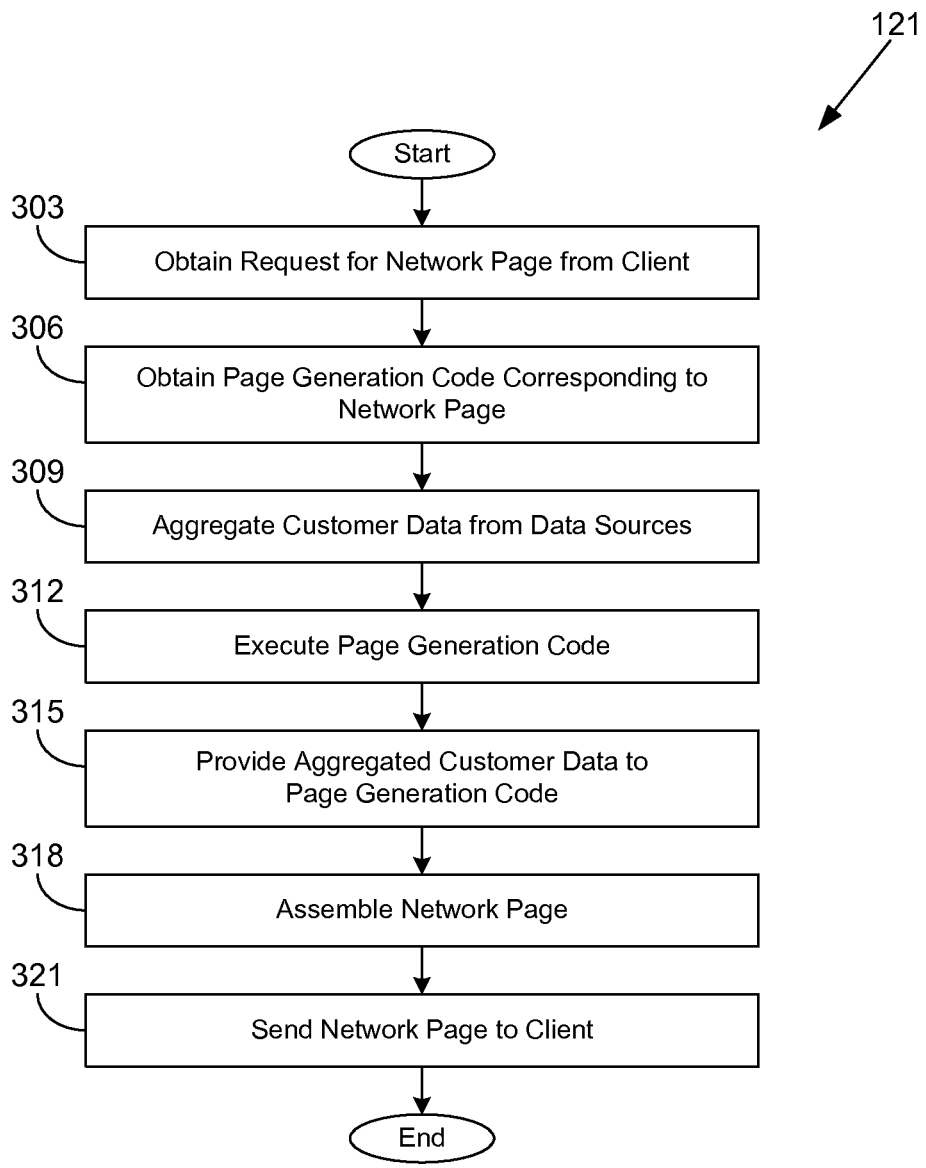
FIGS. 3 and 4 are flowcharts illustrating examples of functionality implemented as portions of a network page generation environment executed in a computing environment in the networked environment of FIG. 1 according to various embodiments of the present disclosure.

Continuing on to FIG. 3, shown is a flowchart that provides one example of the operation of a portion of the network page generation environment 121 according to the embodiments discussed in connection with FIG. 1. It is understood that the flowchart of FIG. 3 provides merely an example of the many different types of functional arrangements that may be employed to implement the operation of the portion of the network page generation environment 121 as described herein. As an alternative, the flowchart of FIG. 3 may be viewed as depicting an example of steps of a method implemented in the computing environment 103 (FIG. 1) according to one or more embodiments.

Beginning with box 303, the network page generation environment 121 obtains a page request 133 (FIG. 1) from the client 106 (FIG. 1) by way of a network page server application 124 (FIG. 1). The page request 133 indicates a network page 130 (FIG. 1) from a network site of a customer. The network site is hosted by the hosting provider who operates the computing environment 103. In box 306, the network page generation environment 121 obtains or fetches page generation code 136 (FIG. 1) corresponding to the requested network page 130. In box 309, the network page generation environment 121 aggregates various data pertaining to the customer from one or more data sources 115 (FIG. 1) by way of the data aggregation service 118 (FIG. 1).

In box 312, the network page generation environment 121 executes the page generation code 136. In doing so, the network page generation environment 121 may perform various runtime checks to ensure that the page generation code 136 does not include any impermissible code or content. In box 315, the network page generation environment 121 provides the aggregated data 139 (FIG. 1) to the page generation code 136 as predefined implicit or environment variables.

In box 318, the network page generation environment 121 assembles the network page 130 using the output of the page generation code 136 and potentially other data. In box 321, the network page generation environment 121 sends the generated network page 130 to the client 106 in response to the page request 133. Thereafter, the portion of the network page generation environment 121 ends.

Figure 4:
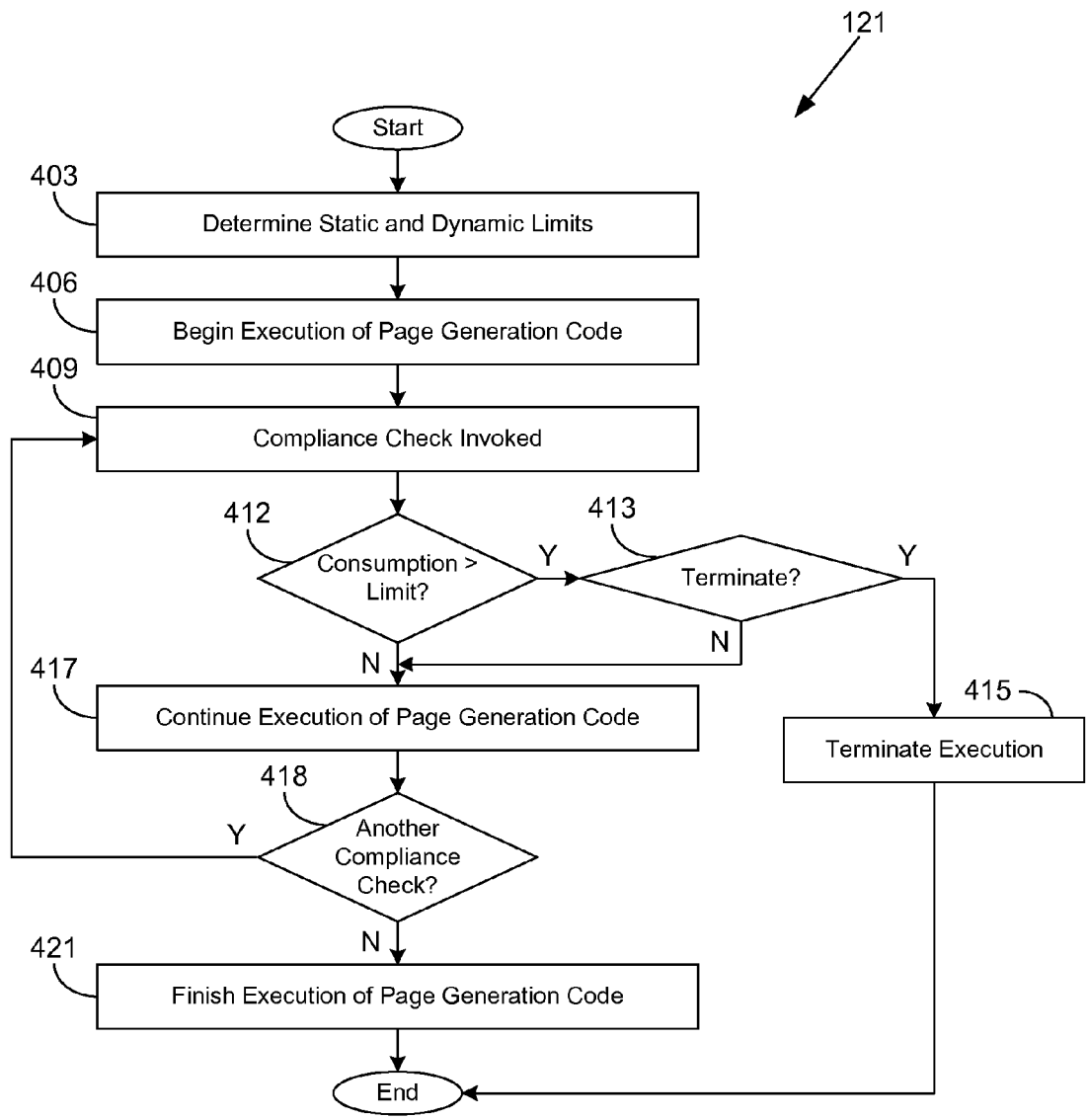

Moving on to FIG. 4, shown is a flowchart that provides one example of the operation of another portion of the network page generation environment 121 according to the embodiments discussed in connection with FIG. 1. In particular, the flowchart of FIG. 4 corresponds to the portion of the network page generation environment 121 represented in box 312 of the flowchart of FIG. 3. It is understood that the flowchart of FIG. 4 provides merely an example of the many different types of functional arrangements that may be employed to implement the operation of the other portion of the network page generation environment 121 as described herein. As an alternative, the flowchart of FIG. 4 may be viewed as depicting an example of steps of a method implemented in the computing environment 103 (FIG. 1) according to one or more embodiments.

Beginning with box 403, the network page generation environment 121 determines various static and dynamic resource consumption limits for the page generation code 136 (FIG. 1). For example, one or more resource consumption limits may be statically configured in the page generation restrictions 157 (FIG. 1). In addition, one or more resource consumption limits may be dynamically determined based at least in part on system state and/or averages or other statistical measures of resource consumption of other page generation code 136.

In box 406, the network page generation environment 121 begins execution of the page generation code 136. Such execution may relate to execution of bytecode or source code, as the case may be. In box 409, a compliance check is invoked. Such a compliance check may be invoked, for example, in response to the page generation code 136 invoking functionality from the tag factory 137 (FIG. 1), periodically, or at some other time. In box 412, the network page generation environment 121 assesses whether the resource consumption of the page generation code 136 meets or exceeds established thresholds or limits.

If the network page generation environment 121 determines that the page generation code 136 meets or exceeds established limits, the network page generation environment 121 determines in box 413 whether execution of the page generation code 136 is to be terminated. If execution is to be terminated, the network page generation environment 121 terminates execution of the page generation code 136 in box 415. An error may be generated and sent to the client 106 (FIG. 1). Thereafter, the portion of the network page generation environment 121 ends. If execution is not to be terminated, the network page generation environment 121 may allow a specific memory allocation to fail, throttle resources provided to the page generation code 136, and/or take another action to reduce resource consumption. Thereafter, the network page generation environment 121 continues to box 418.

If the resource consumption of the page generation code 136 complies with the limits, the network page generation environment 121 moves from box 412 to box 417. In box 417, the network page generation environment 121 allows continued execution of the page generation code 136. Next, the network page generation environment 121 moves to box 418 and determines whether another compliance check is invoked. If another compliance check is invoked, the network page generation environment 121 returns to box 409. If another compliance check is not invoked, the execution of the page generation code 136 finishes normally in box 421. Thereafter, the portion of the network page generation environment 121 ends.

Figure 5:
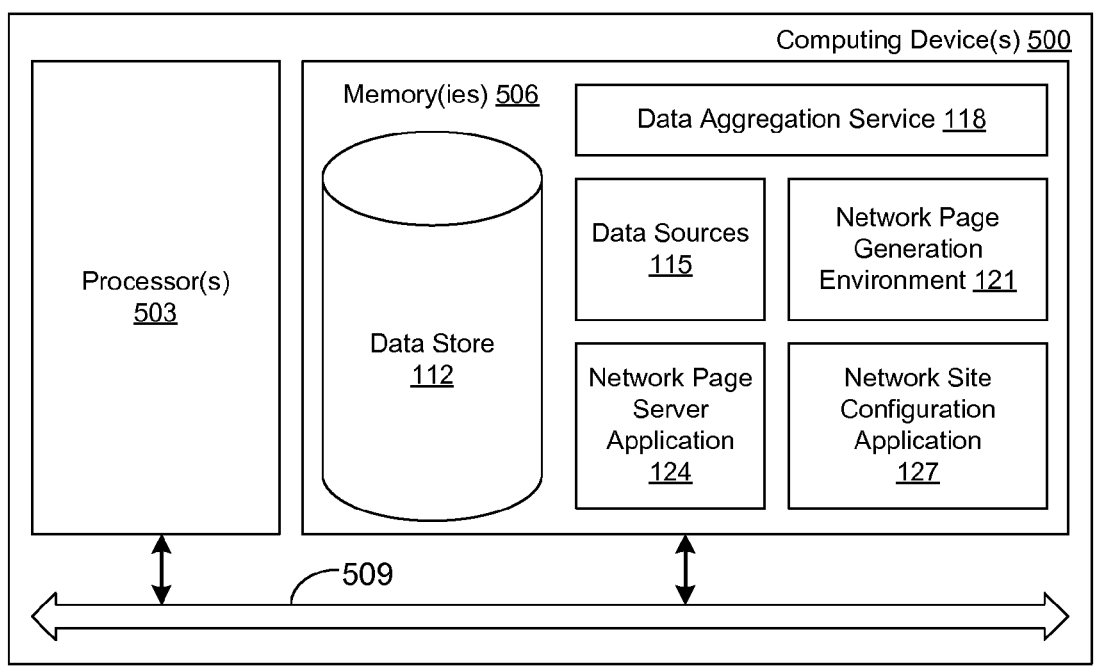
FIG. 5 is a schematic block diagram that provides one example illustration of a computing device employed in the computing environment in the networked environment of FIG. 1 according to various embodiments of the present disclosure.

With reference to FIG. 5, shown is a schematic block diagram of the computing device 500 according to an embodiment of the present disclosure. The computing device 500 corresponds to a representative computing device which may be employed in the computing environment 103 (FIG. 1). The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the data aggregation service 118, the data sources 115, the network page generation environment 121, the network page server application 124, the network site configuration application 127, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the data aggregation service 118, the data sources 115, the network page generation environment 121, the network page server application 124, the network site configuration application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the network site configuration application 127 and the network page generation environment 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data aggregation service 118, the data sources 115, the network page generation environment 121, the network page server application 124, and the network site configuration application 127, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media.

More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
   obtain page generation code from a customer of a hosting provider;
   instrument the page generation code with code that facilitates monitoring of at least one resource consumed by an execution of the page generation code;
   obtain a request for a network page from a client, the network page being associated with a network site hosted by the hosting provider on behalf of the customer; and
   send the network page to the client in response to the request.

2. The non-transitory computer-readable medium of claim 1, wherein, when executed, the program further causes the at least one computing device to at least:
   determine whether the page generation code exceeds a maximum size threshold; and
   reject the page generation code responsive to determining that the page generation code exceeds the maximum size threshold.

3. The non-transitory computer-readable medium of claim 1, wherein, when executed, the program further causes the at least one computing device to at least:
   determine whether the page generation code includes exception-handling code; and
   reject the page generation code in response to determining that the page generation code includes the exception-handling code.

4. The non-transitory computer-readable medium of claim 1, wherein the code that facilitates monitoring is configured to report an estimated resource consumption associated with a function performed by the page generation code, the estimated resource consumption corresponding to at least one of: a memory consumption, an execution time, a processor consumption, or a data output.

5. The non-transitory computer-readable medium of claim 1, wherein the page generation code comprises JavaServer Pages (JSP) code, and the page generation code is executed using a JSP tag library.

6. A system, comprising:
   at least one computing device; and
   at least one application executable in the at least one computing device, wherein, when executed, the at least one application causes the at least one computing device to at least:
      obtain a request for a network page from a client;
      obtain page generation code associated with the network page;
      determine whether the page generation code includes exception-handling code;

in response to determining that the page generation code does not include exception-handling code, execute the page generation code to generate the network page; and send the network page to the client in response to the request.

7. The system of claim 6, wherein the network page is associated with a managed environment operated by a provider on behalf of a customer, and the page generation code is supplied by the customer.

8. The system of claim 6, wherein, when executed, the at least one application further causes the at least one computing device to at least instrument the page generation code with code that facilitates monitoring of at least one resource consumed by an execution of the page generation code.

9. The system of claim 6, wherein, when executed, the at least one application further causes the at least one computing device to at least enforce at least one resource consumption limit on the page generation code when the page generation code is executed.

10. The system of claim 9, wherein the page generation code is executed using a tag library instrumented to facilitate enforcement of the at least one resource consumption limit.

11. The system of claim 9, wherein the resource consumption limit includes at least one of: a limit on data written by the page generation code to an output data stream, an execution time limit, or a memory allocation limit.

12. The system of claim 9, wherein, when executed, the at least one application further causes the at least one computing device to at least determine the at least one resource consumption limit based at least in part on a measure of resource consumption derived from execution of a plurality of other page generation code.

13. The system of claim 6, wherein the page generation code is executed further in response to determining that the page generation code does not exceed a maximum size threshold.

14. The system of claim 6, wherein the at least one application is configured to provide access by the page generation code to a plurality of implicit variables and deny access by the page generation code to system variables other than the plurality of implicit variables.

15. A method, comprising:
 obtaining, in at least one computing device, page generation code;
 determining, in the at least one computing device, whether the page generation code includes exception-handling code; and
 in response to determining that the page generation code does not include the exception-handling code, executing, in the at least one computing device, the page generation code to generate a network page in response to a request for the network page from a client.

16. The method of claim 15, wherein the page generation code is supplied by a customer of a hosting provider, and network page is associated with a network site hosted by the hosting provider on behalf of the customer.

17. The method of claim 15, further comprising determining, in the at least one computing device, an estimated resource consumption associated with a function performed by the page generation code, the estimated resource consumption corresponding to at least one of: a memory consumption, an execution time, a processor consumption, or a data output.

18. The method of claim 15, wherein the page generation code is executed via a virtual machine, and the method further comprises enforcing, in the at least one computing device, at least one resource consumption limit on the page generation code via the virtual machine.

19. The method of claim 15, further comprising instrumenting, in the at least one computing device, the page generation code to report at least one type of resource consumption.

20. The method of claim 15, further comprising compiling, in the at least one computing device, the page generation code in response to determining that the page generation code does not include the exception-handling code.

* * * * *